US006422723B1

(12) United States Patent
Walters

(10) Patent No.: US 6,422,723 B1
(45) Date of Patent: Jul. 23, 2002

(54) PORTABLE COCKPIT ILLUMINATION DEVICE

(75) Inventor: Robert Charles Walters, 2504 Willena Dr. SE., Huntsville, AL (US) 35803

(73) Assignee: Robert Charles Walters, Huntsville, AL (US)

(*) Notice: Subject to any disclaimer, the term of this patent is extended or adjusted under 35 U.S.C. 154(b) by 0 days.

(21) Appl. No.: 09/590,869

(22) Filed: Jun. 9, 2000

(51) Int. Cl.[7] .............................................. B65D 47/02
(52) U.S. Cl. ...................... 362/471; 362/489; 362/545; 362/183; 362/191
(58) Field of Search ................................ 362/471, 489, 362/545, 183, 191, 184

(56) References Cited

U.S. PATENT DOCUMENTS

| | | |
|---|---|---|
| 4,217,625 A | 8/1980 | Klein |
| 4,328,532 A | 5/1982 | Smith |
| 4,580,196 A * | 4/1986 | Task ............... 362/62 |
| 4,710,858 A | 12/1987 | Van Hout |
| 4,977,486 A | 12/1990 | Gotoh |
| 5,022,740 A | 6/1991 | Maziorka |
| 5,023,763 A | 6/1991 | LeGars |
| 5,031,080 A | 7/1991 | Aikens |
| 5,083,246 A | 1/1992 | Lambert |
| 5,124,892 A | 6/1992 | Lambert |
| 5,140,472 A | 8/1992 | Langer |
| 5,353,205 A | 10/1994 | Hudak |
| 6,179,452 B1 | 1/2001 | Dunning |
| 6,247,825 B1 | 6/2001 | Borkowski |

* cited by examiner

*Primary Examiner*—Stephen Husar
*Assistant Examiner*—Bertrand Zeade

(57) ABSTRACT

A portable cockpit illumination device for the purpose of supplementing existing cockpit illumination from an overhead type lamp assembly provides for an even illumination of all cockpit panel instruments. A portable design allows installation or removal from the cockpit in seconds without using any tools. Two modes of operation insure cockpit illumination under any flight conditions. An accessory power receptacle internal to an aircraft cockpit provides power during normal operation, and a self contained battery source provides cockpit illumination during emergency situations when no external power source is available. During normal operation, a charging circuit insures optimal battery performance. A plurality of light emitting diodes (LED's) wired in a series-parallel array receives power from a DC to DC buck converter, whereby an input source voltage is reduced to a lower output voltage. A rheostat controlled feedback voltage loop provides for load current and illumination control.

4 Claims, 7 Drawing Sheets

PORTABLE COCKPIT ILLUMINATION DEVICE

CROSS-REFERENCE TO RELATED APPLICATIONS

Not Applicable

BACKGROUND FIELD OF INVENTION

The present invention relates generally to portable lights incorporating a lamp and an electrical power source. More specifically, the present invention relates to portable illumination of aircraft cockpit instruments using light emitting diodes (LEDs).

BACKGROUND DESCRIPTION OF PRIOR ART

Modern aircraft are equipped with a light source for illumination of cockpit instruments for use during nighttime and low ambient light conditions. Illumination is usually performed by small incandescent lamps integrated into the instruments or instrument panel. These small laps provide sufficient illumination of the cockpit instruments and their luminance is sometimes adjustable. Small general aviation aircraft built in the past however, have little or no cockpit instrument illumination available. Their instruments or instrument panels are not equipped with integral lamps, and illumination is sometimes provided only by a single incandescent lamp usually mounted onto the overhead ceiling of the cockpit. The purpose of the single lamp is for providing a flood lamp effect over the entire instrument panel. However, due to the overhead location of the light source found on most small general aviation aircraft, the pilot and the steering or control yokes usually block the flood beam. This causes shadows or dark areas on the instrument panel, and as a result, visual scanning of all cockpit instruments in a normal sequence is interrupted since time is required for the pilot's eyes to adjust to the difference in instrument illumination. In an attempt to prevent night blindness and improve night vision, prior art also incorporates a red filter lens into the overhead lamp assembly. A drawback of the red lens, however, greatly reduces the luminance of the instrument panel. Aircraft manufacturers recognized this design flaw and have greatly improved cockpit illumination with various prior art methods such as integrating multiple lamps into the instruments, thus eliminating any shadows or dark areas on the instrument panel.

The following prior art references relate to modem aircraft with integral panel lights, and do not apply to older aircraft that employ a flood beam method for panel illumination. U.S. Pat. No. 5,023,763 to LeGras (1991) provides for an illuminated panel display, and U.S. Pat No. 4,710,858 to Van Hout et al. (1987) provides for ligted panel display switches. U.S. Pat No. 4,217,625 to Klein (1980) provides for lighted sent dial faceplates using integral LEDs, and U.S. Pat. No. 4,977,486 to Gotoh (1990) provides for a method of illuminating displays using a light guiding member similar to a light pipe. U.S. Pat No. 5,140,472 to Langer et al. (1992) provides for a passive prism device for direct daylight viewing of cockpit instruments. There are however, many older aircraft presently operating today that were manufactured before any design improvements were incorporated. The following prior art patents attempt to compensate for the single overhead light assembly without employing integral panel lights or inter panel lighting methods, but only provide partial instrument panel illumination. U.S. Pat. No. 5,031,080 to Aikens et al. (1991) provides for a flashlight with a rotating filter used in conjunction with night vision equipment, and U.S. Pat. No. 5,353,205 to Hudak (1994) provides for a helmet mounted or detachable flashlight used in conjunction with night vision equipment U.S. Pat. No. 5,083,246 to Lamert (1992) provides for a single helmet mounted LED, and U.S. Pat. No. 5,124,892 to Lambert (1992) provides for a hand mounted LED.

Most pilots of older aircraft have lined to compensate with the drawbacks of the flood lamp illumination method by carrying a backup flashlight or similar prior art during nighttime and low light level conditions. This enables the pilot to scan the darker areas of the instrument panel, but requires the pilot use a free hand to scan and operate the flashlight. This practice can place the pilot in a dangerous situation, especially during the landing and takeoff phases of flight where both hands are required to operate multiple tasks such as instrument scanning, throttle control, radio communications, and operation of flaps and landing gear. In prior art methods where helmet or hand mounted light sources are used, repetitive head or hand movements are required in order to scan an panel instruments. The repetitive head or hand movements result in pilot fatigue. Although U.S. Pat. No. 4,580,196 to Task (1986) provides for an even illumination of cockpit panel instruments in conjunction with night vision equipment through the use of multiple LED arrays, it does not provide for a backup illumination method in the event of an emergency when all cockpit lights have failed. It is common aviation knowledge that a loss of cockpit panel illumination even for only a moment can place the pilot into spatial disorientation whereby the pilot is disoriented and unable to fly without any instruments or outside visual cues for reference. Prior art methods provide a supplement to the overhead light assembly method, but do not incorporate full instrument panel illumination while also providing a backup or emergency power source.

Therefore a need exists in the art to provide a supplemental light source for older aircraft that is portable, light weight, cost effective, and provides an even illumination of all cockpit panel instruments. In addition, a need exists in the art for providing emergency cockpit panel illumination for older aircraft in the event of an in-flight electrical failure.

SUMMARY

In accordance with the present invention, a portable lightweight unit comprises a DC to DC converter circuit, an array of LEDs, an emergency battery, and a method for maintaining emergency battery charge during non-emergency conditions. The present invention receives electrical power from either an external aircraft power source or from an internal emergency battery source. During normal operation, the primary power source is derived from a standard accessory power outlet inside the cockpit. Capable of operating over a wide range of aircraft voltages, the present invention is compatible with 12, 24, and 28 volt DC aircraft electrical systems. Primary power also maintains the internal battery's charge for optimal battery power through the present invention's internal regulator circuit In the event of an aircraft electrical system failure, the internal battery provides emergency power, and maintains instrument panel illumination. Instrument panel luminance is adjustable by controlling the amount of feedback voltage to the internal DC to DC buck type converter, which in turn changes the amount of constant current provided to the LED array.

OBJECTS AND ADVANTAGES

The present invention corrects the problems associated with the single flood lamp method by providing a portable lightweight unit comprised of a DC to DC converter circuit with an array of multiple LEDs evenly distributed in a row. The distributed LED array results in an even illumination of the cockpit instrument panel without dark areas thus eliminating the need for a supplemental flashlight or similar prior art.

It is therefore an object of the invention to provide circuitry for of an IED a in a portable cockpit illumination device capable of operation from 12, 24, 28, and emergency battery voltages.

It is another object of the invention to provide emergency cockpit illumination that further provides an even illumination of the cockpit instrument panel, whereby all cockpit panel instruments are readily distinguished by the pilot.

It is another object of the invention to provide a portable cockpit illumination device as a bock up or supplement to existing aircraft light systems.

It is a further object of the invention to provide a lightweight, portable cockpit illumination device that can easily be installed or removed from an aircraft without the use of any tools.

The present invention is capable of operating over a wide range of standard aircraft voltages during normal operations, and provides emergency power from an internal battery during emergency operations, thus allowing the pilot to continue flying until a safe landing is possible.

The present invention also greatly increases the safety of night flying by keeping the pilot focused during an emergency, thus reducing the induced stress from a loss of cockpit lights.

The present invention quickly attaches inside the aircraft without the use of any tools or modifications to the aircraft, and can be easily removed for use in other aircraft. This feature is particularly useful to pilots who rent rather than own their aircraft.

DESCRIPTION OF THE PREFERRED EMBODIMENTS

The present invention incorporates a method and apparatus for providing illumination to an aircraft cockpit instrument panel. In order to provide a more thorough description of the invention, numerous details are explained and illustrated. It will be apparent to one skilled in the art that the invention may be practiced without these specific details. Well known details and features have not been described in order to clarify the invention.

Figure 1:
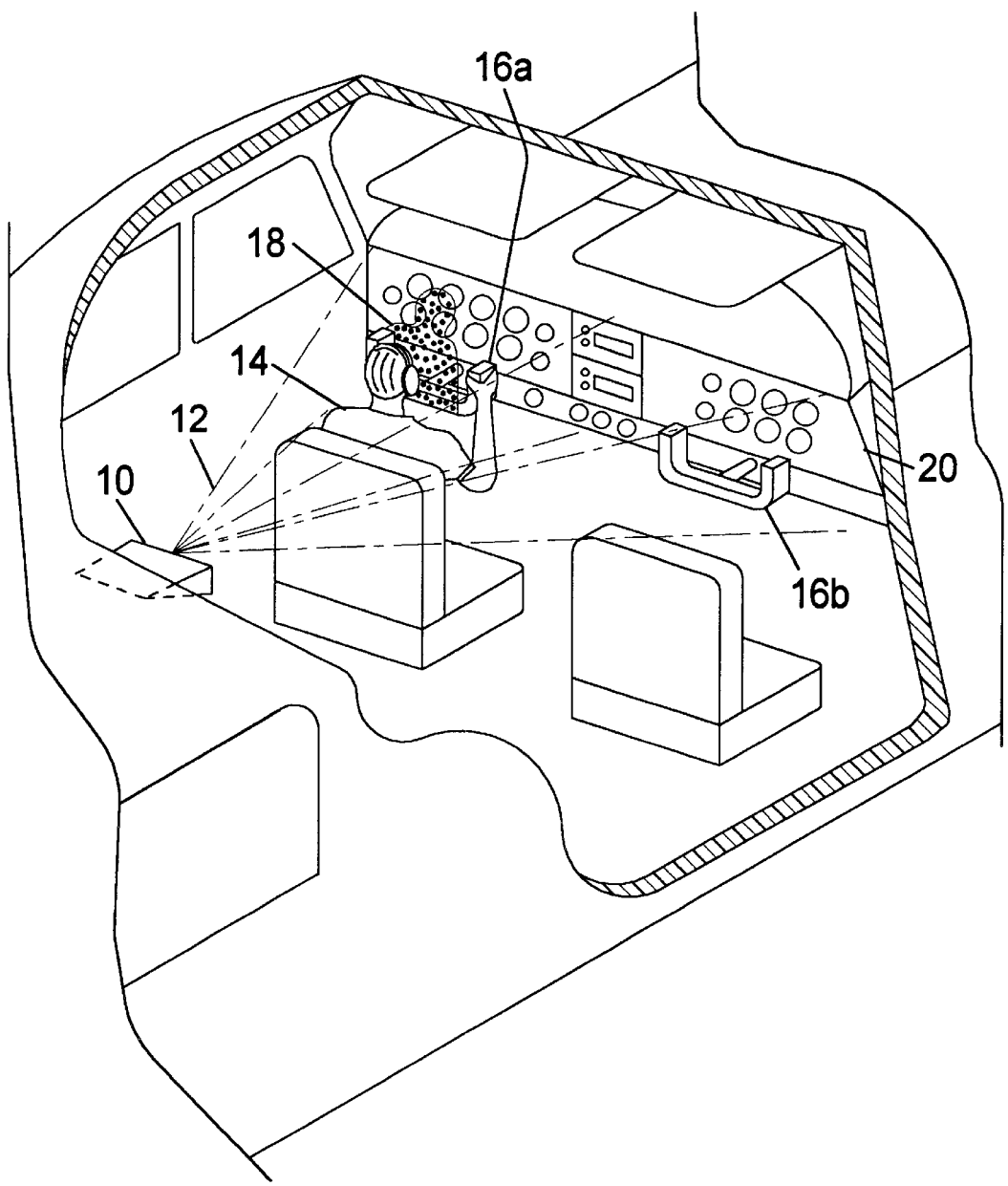
FIG. 1 is a prior art peeve view of a typical small aircraft employing a single overhead lamp assembly with part instrument panel illumination due to a blocked beam of the overhead lamp assembly.
Figure 2:
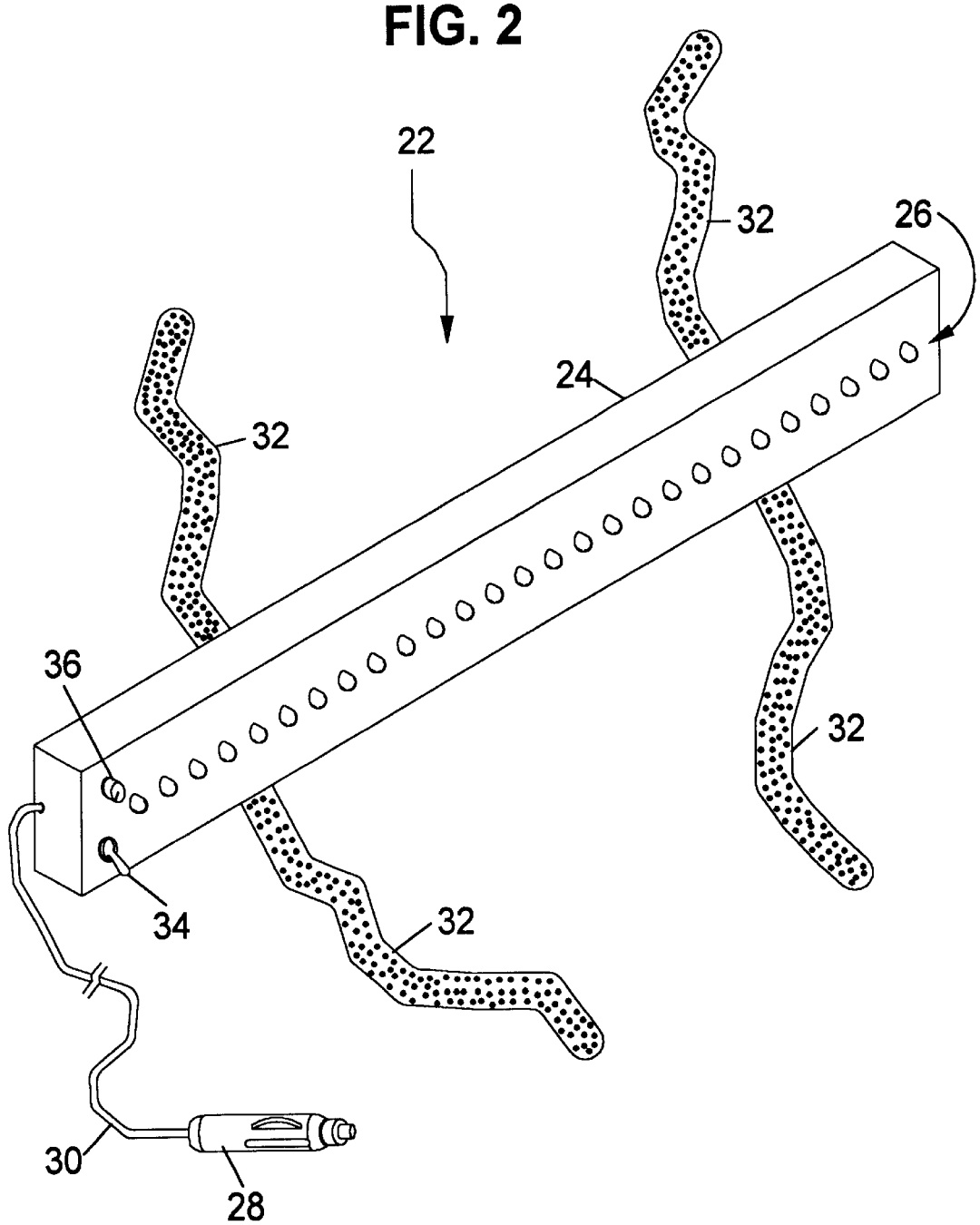
FIG. 2 is a perspective view of a preferred embodiment of the present invention.
Figure 3:
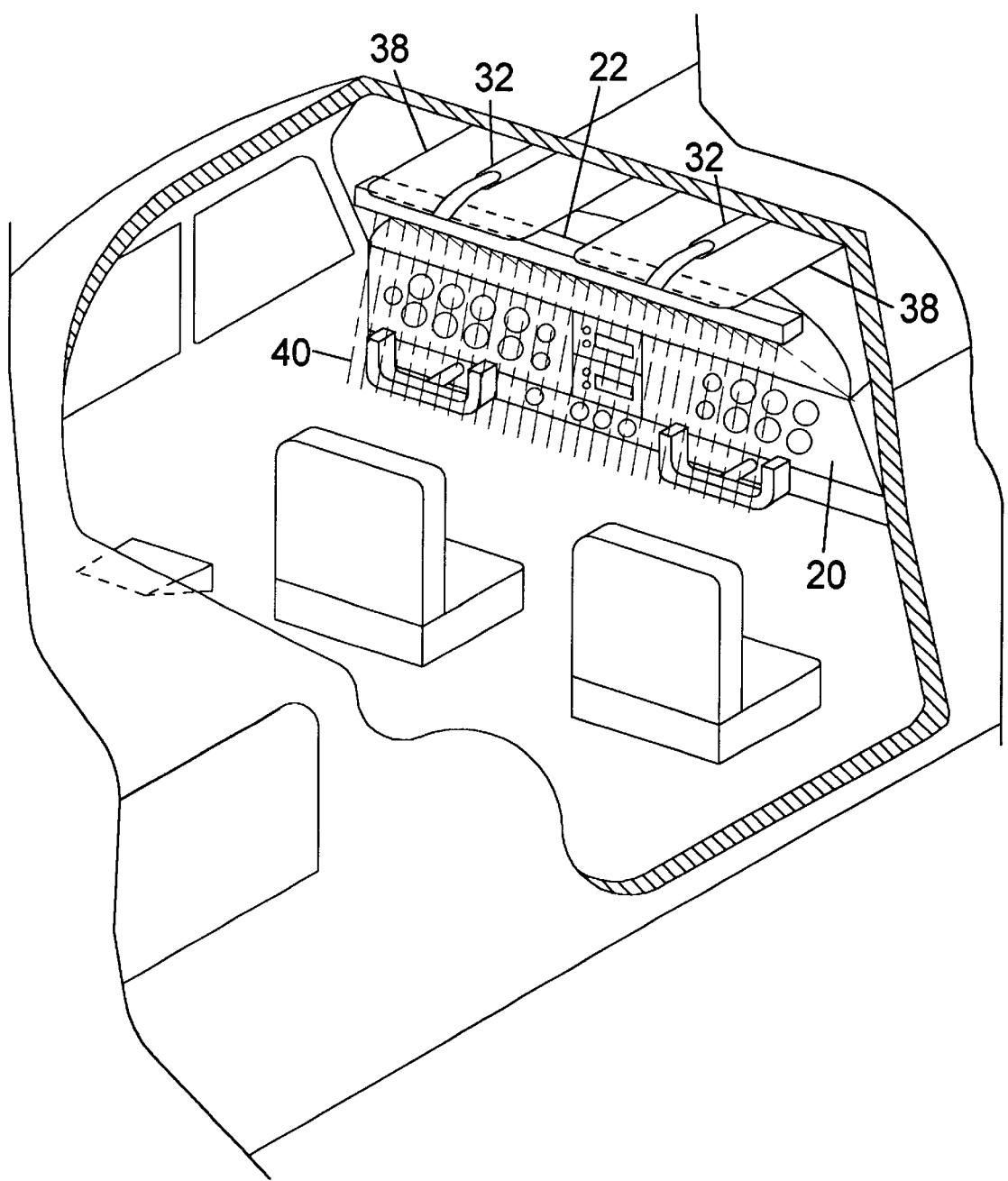
FIG. 3 is a perspective view of the present invention illustrating the preferred mounting technique.
Figure 4:
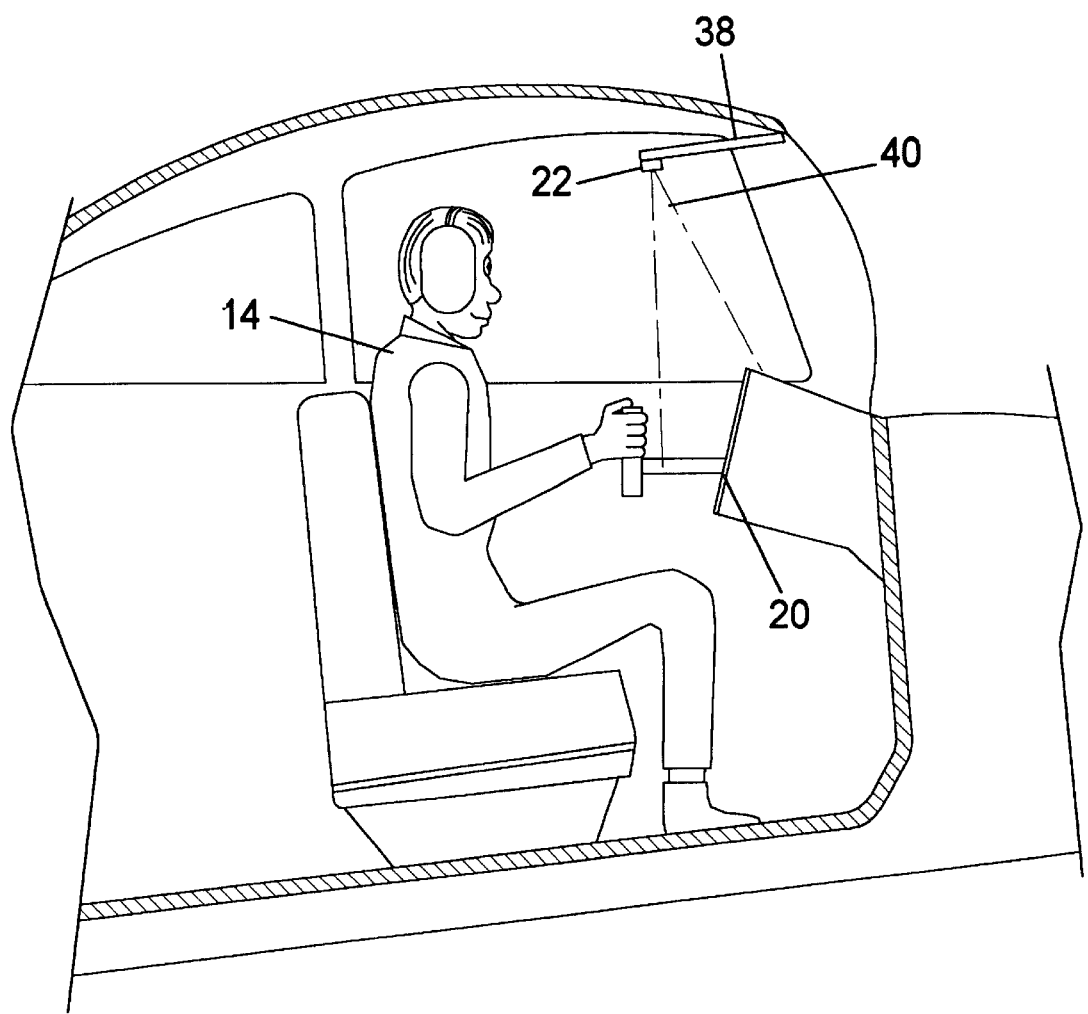
FIG. 4 is a side view of a typical small aircraft illustrating the preferred location of the present invention.

Illustrated in FIG. 1 is a typical location for a prior art single lamp assembly 10. The purpose of a single lamp assembly 10 is for providing a flood lamp effect over the entire instrument panel. However, due to the general overhead location found on most small general aviation aircraft, the pilot 14 and steering or control yokes 16a and 16b as illustrated in FIG. 1 block the flood beam 12. This causes shadows or dark areas 18 on cockpit instrument panel 20. FIG. 2, illustrates a preferred embodiment 22 of the invention A housing 24, provides a lightweight case for containing internal circuitry and evenly distributed LEDs 26. Embodiment 22 receives aircraft power through a typical automobile type power receptacle 28, and insulated wire pair 30 provides the circuit connection. Mounting straps 32 comprise a hook and loop fastener. Switch 34 is in the ON position during operation and luminance is varied with intensity control 36. Since most small aicraft are equipped with visors similar to visors typically found on automobiles, FIG. 3 and FIG. 4 illustrate the preferred mounting and location of preferred embodiment 22. However, those skilled in the art could use an alternate mounting method if sun visors do not exist in a particular aircraft. Referring to FIG. 3, preferred embodiment 22 attaches quickly and conveniently to visors 38 with hook and loop straps 32, and embodiment 22 provides a distributed beam path 40 to instrument panel 20. Referring to FIG. 4, beam path 40 is in front of pilot 14, and instrument panel 20 is evenly illuminated, and absent of any pilot or steering control induced shadows. In addition, the slim design of preferred embodiment 22 does not obscure the pilot's outside view, is lightweight, and does not came unintentional sag of visors 38. However, beam path 40 is adjusted simply by changing the position angle of visors 38.

Figure 5:
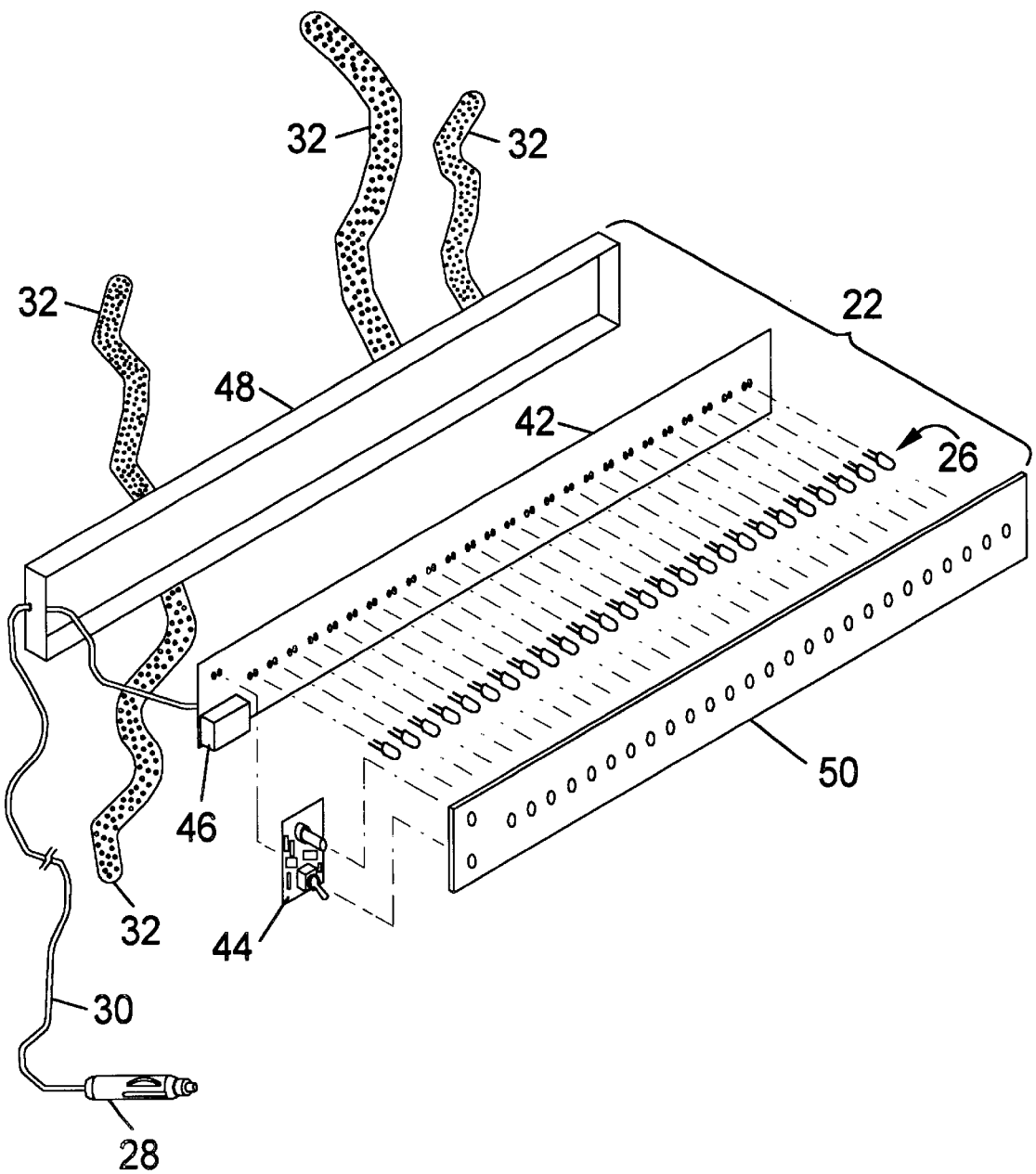
FIG. 5 is an exploded view of the present invention.

FIG. 5 is an exploded view of preferred embodiment 22. Printed circuit board 42, combines an assembly of a power supply 44, multiple LEDs 26, and a battery 46. Printed circuit board 42 also provides the necessary electrical connections to power supply components, and to LEDs 26 in a series parallel arrangement. During normal operation, aircraft power is supplied through receptacle 28 and wire pair 30. Back 48 and cover 50, provide for a lightweight, slim package that is portable, and can be installed or removed from the aircraft in seconds.

Figure 6:
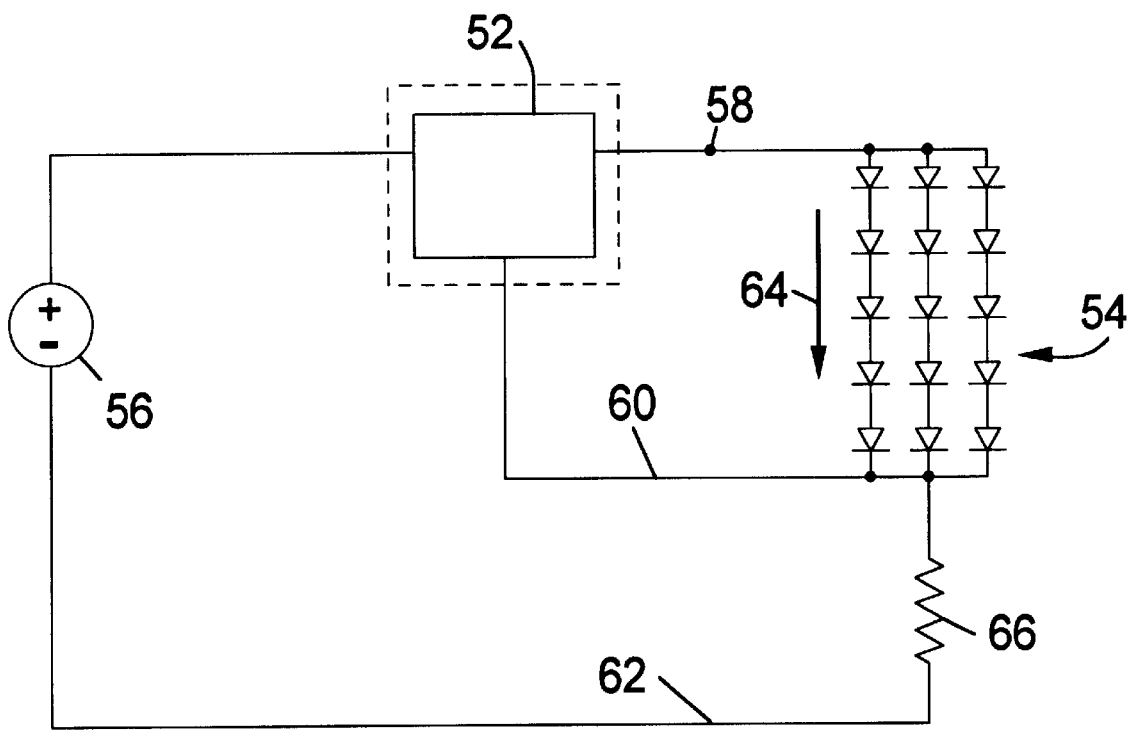
FIG. 6 is a prior art circuit diagram illustrating a buck converter connected to an array of light emitting diodes.

FIG. 6 illustrates a prior art buck converter power supply 52 attached to an LED array 54 wired in a series parallel configuration. A conventional DC buck converter 52, changes a higher DC input voltage source 56 to a lower DC output voltage at node 58. Output voltage at node 58 is maintained when feedback reference node 60 is equal to 2.5 volts. Ground reference node 62 provides a return path for input source 56. Luminance from LED array 54 is determined by the amount of total load current 64. Since feedback reference node 60 is equal to 2.5 when output voltage 58 is constant, total load current 64 is therefore equal to 2.5 volts divided by the value of resistor 66. Hence total luminance from array 54 changes proportionally to the value of resistor 66, and is independent of the value of input source 56.

Figure 7:
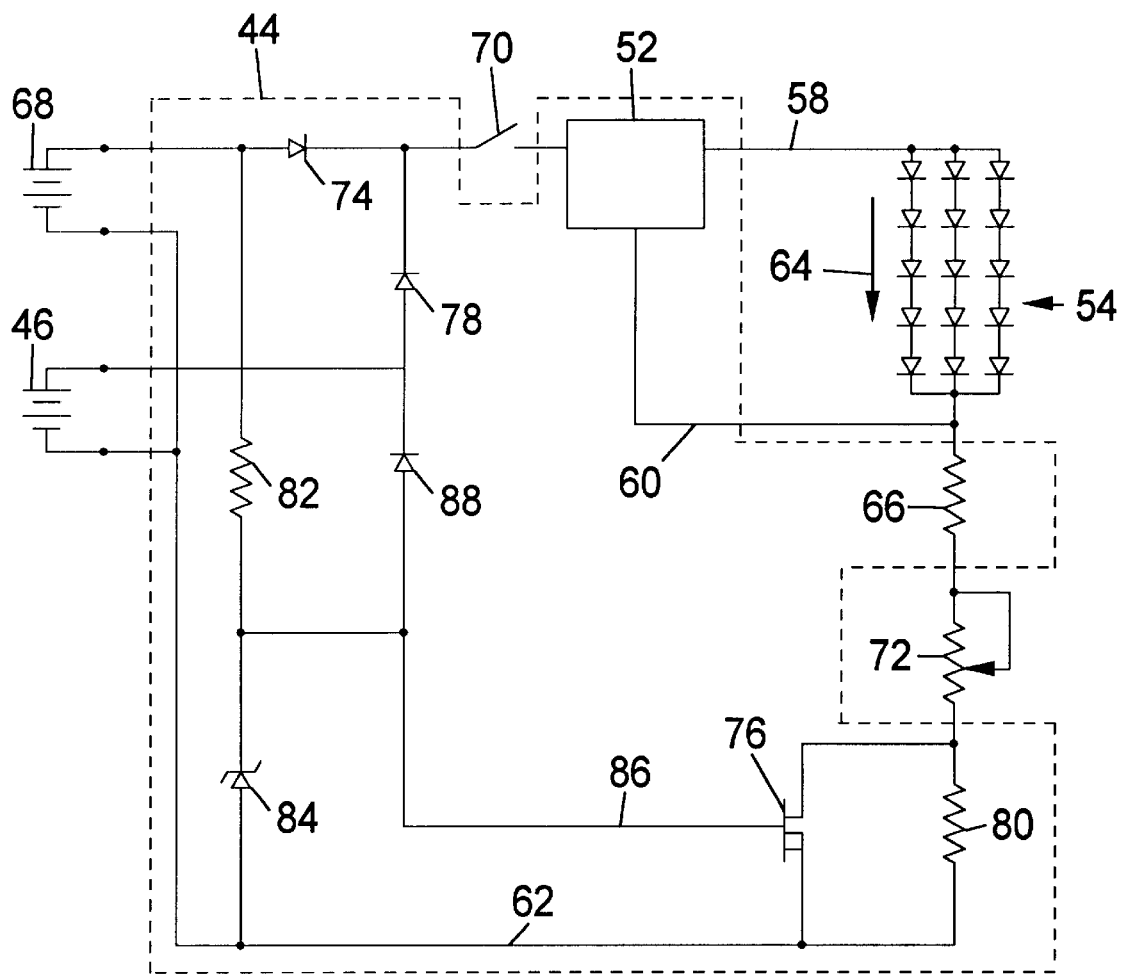
FIG. 7 is a circuit diagram illustrating an embodiment of the invention which employs a DC buck converter connected to an array of LEDs which utilizes battery conditioning and emergency current limiting functions.

FIG. 7 illustrates a circuit embodiment of the present invention based on a prior art DC buck converter. During normal or non-emergency operation, the present invention is powered from a stand aircraft voltage source 68, typically ranging from 12 to 28 volts DC depending upon the specific model of aircraft. Switch 70 disables the present invention when not in use, and prevents discharge of emergency battery 46. Rheostat 72 adjusts the amount of desired luminance from LED array 54. Current flow during normal operation begins at source 68, and can be traced through diode 74, switch 70, converter 52, LED array 54, resistor 66, rheostat 72, field effect transistor or FET 76, and returning to source 68 through ground node 62. During normal operation, diode 78 is reversed biased and prevents source 68 from overcharging battery 46. In addition, current does not flow through resistor 80 and is bypassed by FET 76. An auxiliary battery charging current path begins at source 68, and can be traced through resistor 82. Zener diode 84 is reversed biased and regulates node 86 to 10 volts. The current at node 86 is determined by the voltage drop across resistor 82, providing a small charge current, thus enabling the gate of FET 76, and also forward biasing diode 88 providing a maintenance charge to battery 46 during normal operation During emergency conditions, when aircraft power source 68 is no longer available, or is less than 10 volts, the present invention is powered from battery 46. Current flow during emergency conditions begins at battery 46, and can be traced through diode 78, switch 70, converter 52, LED array 54, resistor 66, rheosat 72, resistor returning to battery 46 through ground node 62. The voltage at node 86 is low, FET 76 is turned off, and diode 74 and diode 88 are reversed biased preventing battery 46 from discharging back into aircraft source 68. Since node 60 is equal to 2.5 volts when output voltage 58 is constant, series connected resistor 80 reduces the total amount of load current 64, and thus limits the amount of luminance available from LED array 54. This feature extends the life of emergency battery 46 by limiting maxi mum during emergency conditions.

CONCLUSION, RAMIFICATIONS, AND SCOPE

The present invention is intended for use as a portable cockpit illumination system in general aviation aircraft that do not employ integral integral panel lights. This includes all aircraft that employ the flood beam method of instrument panel illumination. However the present invention could be used as a portable back-up lighting system in any general aviation aircraft.

The present invention is capable of operating over a wide range of standard aircraft voltages during normal operations, and provides emergency power from an internal battery during emergency operations, thus allowing the pilot to continue flying until a safe landing is possible. The present invention also greatly increases the safety of night flying by keeping the pilot focused during an emergency, thus reducing the induced stress from a loss of cockpit lights. The present invention quickly attaches inside the aircraft without the use of any tools or modifications to the aircraft, and can be easily removed for use in other aircraft. This feature is particularly useful to pilots who rent rather than own their aircraft.

It has been shown the present invention corrects the problems associated with prior art methods by providing a portable, lightweight unit comprised of a DC to DC converter circuit with an array of multiple LEDs evenly distributed in a row. The distributed LED array results in an even illumination of the cockpit instrument panel without dark areas thus eliminating the need for a supplemental flashlight or similar prior art methods.

| REFERENCE NUMERALS IN DRAWINGS | | | |
|---|---|---|---|
| 10 | prior art single lamp assembly | 12 | flood beam |
| 14 | pilot | 16a | control yoke 1 |
| 16b | control yoke 2 | 18 | dark area |
| 20 | instrument panel | 22 | preferred embodiment |
| 24 | housing | 26 | light emitting diodes (LEDs) |
| 28 | receptacle | 30 | wire pair |
| 32 | mounting strap | 34 | power switch |
| 36 | intensity control | 38 | visor |
| 40 | distributed beam path | 42 | printed circuit board |
| 44 | power supply | 46 | battery |
| 48 | back | 50 | cover |
| 52 | prior art buck converter power supply | 54 | LED array |
| 56 | input voltage source | 58 | output voltage node |
| 60 | feedback reference node | 62 | ground reference node |
| 64 | total load current | 66 | resistor |
| 68 | aircraft voltage source | 70 | switch |
| 72 | rheostat | 74 | diode |
| 76 | field effect transistor (FET) | 78 | diode |
| 80 | resistor | 82 | resistor |
| 84 | Zener diode | 86 | node |
| 88 | diode | | |

What is claimed is:

1. A portable nighttime and emergency instrument panel illumination apparatus comprising:

an external power source means and a housing for containing:

a plurality of light emitting diodes, an internal battery, a battery recharging circuit, a direct current converter circuit, and a mounting means;

said external power source means includes an external receptacle and a wire pair electrically connected inside said housing to said light emitting diodes, said battery charging, and said converter circuits, mounting means comprises both elements of a hook and loop fastener and is permanently attached to said housing accommodating for quick installation and removal from said cockpit, electrical connection means of:

(A) said external power source to said converter and said light emitting diodes for illumination of said instrument panel during said nighttime or low ambient light conditions,
(B) said internal battery to said converter and said light emitting diodes for illumination of said instrument panel during failure or malfunction of said external power source,
(C) said external power source and said battery recharging circuit for maintaining charge of said internal battery.

2. The apparatus in claim 1 wherein the luminance from said light emitting diodes is rheostat adjustable.

3. The apparatus in claim 1 wherein the voltage range of said external power source is from 10 to 30 volts direct current.

4. The apparatus in claim 1 wherein said cockpit further has a visor and said housing is attached to said visors wherein the illuminated beam path is absent of shadows and is adjusted by changing said visor angle.

* * * * *